(12) United States Patent
Chang et al.

(10) Patent No.: US 8,305,506 B2
(45) Date of Patent: Nov. 6, 2012

(54) PIXEL SET

(75) Inventors: Yuan-Hao Chang, Taipei (TW);
Huei-Chung Yu, Taoyuan County (TW);
Yi-Chen Chiu, Taoyuan County (TW)

(73) Assignee: Chunghwa Picture Tubes, Ltd.,
Taoyuan (TW)

( * ) Notice: Subject to any disclaimer, the term of this patent is extended or adjusted under 35 U.S.C. 154(b) by 574 days.

(21) Appl. No.: 12/550,410

(22) Filed: Aug. 31, 2009

(65) Prior Publication Data

US 2010/0328563 A1 Dec. 30, 2010

(30) Foreign Application Priority Data

Jun. 24, 2009 (TW) .............................. 98121147 A

(51) Int. Cl.
*G02F 1/1343* (2006.01)
(52) U.S. Cl. ......................................... 349/38; 349/139
(58) Field of Classification Search .................... 349/38, 349/39, 139
See application file for complete search history.

(56) References Cited

U.S. PATENT DOCUMENTS 7,511,777 B2 * 3/2009 Lee .................................. 349/38

FOREIGN PATENT DOCUMENTS

| CN | 1396486 | 2/2003 |
| TW | 200905347 | 2/2009 |

OTHER PUBLICATIONS

"First Office Action of China Counterpart Application", issued on Jun. 11, 2011, p. 1-p. 4.

* cited by examiner

*Primary Examiner* — Richard Kim
*Assistant Examiner* — David Chung
(74) *Attorney, Agent, or Firm* — Jianq Chyun IP Office

(57) ABSTRACT

A pixel set including two scan lines parallel to each other, a data line intersected with the scan lines, and two pixels located between the scan lines is provided. The pixels are at two sides of the data line, respectively. Each pixel includes an active device disposed adjacent to the data line, a pixel electrode, a storage capacitance electrode partially overlapped with the pixel electrode, and a drain compensating pattern including a branch. The branch is located at a side of the pixel electrode away from the data line, and has a concavity located at a side of the branch adjacent to the data line. The drain compensating pattern is connected to a drain of the active device. A portion of the drain compensating pattern is located inside the concavity. The branch is not overlapped with the drain compensating pattern at a side of the concavity away from the gate.

10 Claims, 4 Drawing Sheets

PIXEL SET

CROSS-REFERENCE TO RELATED APPLICATION

This application claims the priority benefit of Taiwan application serial no. 98121147, filed Jun. 24, 2009. The entirety of the above-mentioned patent application is hereby incorporated by reference herein and made a part of specification.

BACKGROUND OF THE INVENTION

1. Field of the Invention

The present invention is related to a pixel set, and in particular, to a pixel set having a design of capacitance compensation.

2. Description of Related Art

Generally, an active matrix liquid crystal display (AM-LCD) mainly includes an active device array, a color filter and a liquid crystal layer. FIG. 1 is a schematic top view of a conventional active device array. Referring to FIG. 1, an active device array 100 mainly includes a plurality of pixels 110 arranged to form an array. Each of pixels 110 comprises a scan line 112, a data line 114, an active device 116 and a pixel electrode 118 corresponding to the active device 116.

It is noted that two adjacent pixels 110 share one data line 114 in the active device array 100 for saving the amount of the data lines 114 so as to reduce the loading of the driving chips or the amount of the driving chips. That is to say, the pixels 110 of the active device array 100 are configured in pairs. Simultaneously, a storage capacitance electrode 120 is further disposed in the pixel 110 for stabilizing the display frame of the liquid crystal display. Moreover, the active device 116 can be directly disposed on the scan line 112 for enlarging the disposition area of the pixel electrode 118, that is to say, the scan line 112 and the active device 116 share the same space.

FIG. 2 is an equivalent circuit diagram of a liquid crystal display (LCD) applying the active device array of FIG. 1. Referring to FIG. 2, the pixel of a conventional active matrix LCD generally comprises an active device 116, a liquid crystal capacitance $C_{LC}$ and a storage capacitance $C_{st}$.

Referring to FIGS. 1 and 2, the liquid crystal capacitance $C_{LC}$ is formed by coupling the pixel electrode 118 on the active device array 100 and a common electrode on the color filter (not shown). The storage capacitance $C_{st}$ is formed by coupling the pixel electrode 118 and the storage capacitance electrode 120, and the storage capacitance $C_{st}$ is parallel to the liquid crystal capacitance $C_{LC}$. In addition, the gate G, the source S and the drain D of the active device 116 are electrically connected to the scan line 112, the data line 114 and the pixel electrode 118 of the liquid crystal capacitor $C_{LC}$, respectively. An overlapping region is formed between the gate G and the drain D of the active device 116, i.e. the area with oblique lines illustrated in FIG. 1. Therefore, a gate-drain parasitic capacitance $C_{gd}$ is formed between the gate G and the drain D.

Referring to FIG. 1 and FIG. 2 again, the voltage applied to the liquid crystal capacitance $C_{LC}$ commonly keeps a certain relationship with the light transmissive rate of the liquid crystals. Accordingly, a desired frame is displayed by a display if only the voltage applied to the liquid crystal capacitance $C_{LC}$ is modulated according to the desired frame. Nevertheless, the gate-drain parasitic capacitance $C_{gd}$ is formed, and thus the voltage maintained in the liquid crystal capacitance $C_{LC}$ is varied with the signal change of the data line 114. Such a voltage variation is called feed-through voltage $\Delta V_p$ and is expressed as formula (1):

$$\Delta V_p = \frac{C_{gd}}{C_{gd} + C_{st} + C_{LC}} \Delta V_g \quad (1)$$

wherein $\Delta V_g$ indicates an amplitude of a pulse voltage applied on the scan line 112.

In the current manufacturing process of the active device array, the displacement error during movements of the machine would cause nonconformity among the positions of each element. Particularly, when the area of the overlapping region between the gate G and the drain D of the active device 116 such as the area with oblique lines shown in FIG. 1 varies, the gate-drain parasitic capacitance $C_{gd}$ is changed. Accordingly, the feed-through voltage $\Delta V_p$ of each pixel 100 in a pair is different from each other, and uneven display brightness during display is generated.

SUMMARY OF THE INVENTION

The present invention is directed to a pixel set having a design for compensating the variations of the gate-drain parasitic capacitance caused by the displacement error of the manufacturing process.

The present invention provides a pixel set including two scan lines, a data line and two pixels. Two scan lines are parallel to each other, and the data line intersects with the two scan lines. The two pixels are located between the two scan lines and at two sides of the data line, respectively. The two pixels are respectively electrically connected to the two scan lines, wherein each of the pixels includes an active device, a pixel electrode, a storage capacitance electrode and a drain compensating pattern. The active device is disposed adjacent to the data line, and the active device includes a gate, a drain and a source. The gate is electrically connected to a corresponding one of the two scan lines. The source is electrically connected to the data line. The source and the drain are located at two opposite sides of the gate, respectively. The pixel electrode is electrically connected to the drain. The storage capacitance electrode is at least partially overlapped with the pixel electrode and the storage capacitance electrode includes a branch. The branch is located at a side of the pixel electrode away from the data line and has a concavity. The concavity is located at a side of the branch adjacent to the data line. The drain compensating pattern is connected to the drain, and at least a portion of the drain compensating pattern is located inside the concavity. A portion of the branch at a side of the concavity away from the gate is not overlapped with the drain compensating pattern.

In an embodiment of the present invention, the branch is substantially aligned with the edge of the drain compensating pattern at a side of the concavity adjacent to the gate.

In an embodiment of the present invention, the branch of one pixel is partially overlapped with the edge of the drain compensating pattern at a side of the concavity adjacent to the gate, while the branch of the other pixel is not overlapped with the drain compensating pattern.

In an embodiment of the present invention, a first distance between the branch and the drain compensating pattern of each pixel at the side of the concavity away from the gate is, for example, larger than a second distance between the branch and the drain compensating pattern at a side of the concavity adjacent to the gate.

In an embodiment of the present invention, the storage capacitance electrode of each of the pixels is in a U-shape, and the storage capacitance electrode substantially surrounds the edge of the pixel electrode.

In an embodiment of the present invention, the active device of each of the pixels further includes a semi-conductor pattern located between the gate, the source, and the drain.

In an embodiment of the present invention, each of the gates is located inside a corresponding one of the scan lines.

In an embodiment of the present invention, the pixel set further includes a connecting pattern to electrically connect the two storage capacitance electrodes of the two pixels. For example, the connecting pattern and the two storage capacitance electrodes of the two pixels are formed integrally.

In an embodiment of the present invention, the drain compensating pattern and the drain in each of the pixels are formed integrally.

In an embodiment of the present invention, in each of the pixels, a width of the branch at a portion on which the concavity is located is smaller than that of the branch at the other portion.

In view of the above, a concavity is formed in the storage capacitance electrode of the pixel set according to the present invention, and the drain compensating pattern is extended into the concavity so as to compensate the variation of the gate-drain parasitic capacitance between the gate and the drain. Accordingly, the pixel set of the present invention can improve the display evenness of a display when the pixel set is applied to the display. In addition, the pixel set of the present invention needs no additional element so that the manufacturing cost is not increased.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
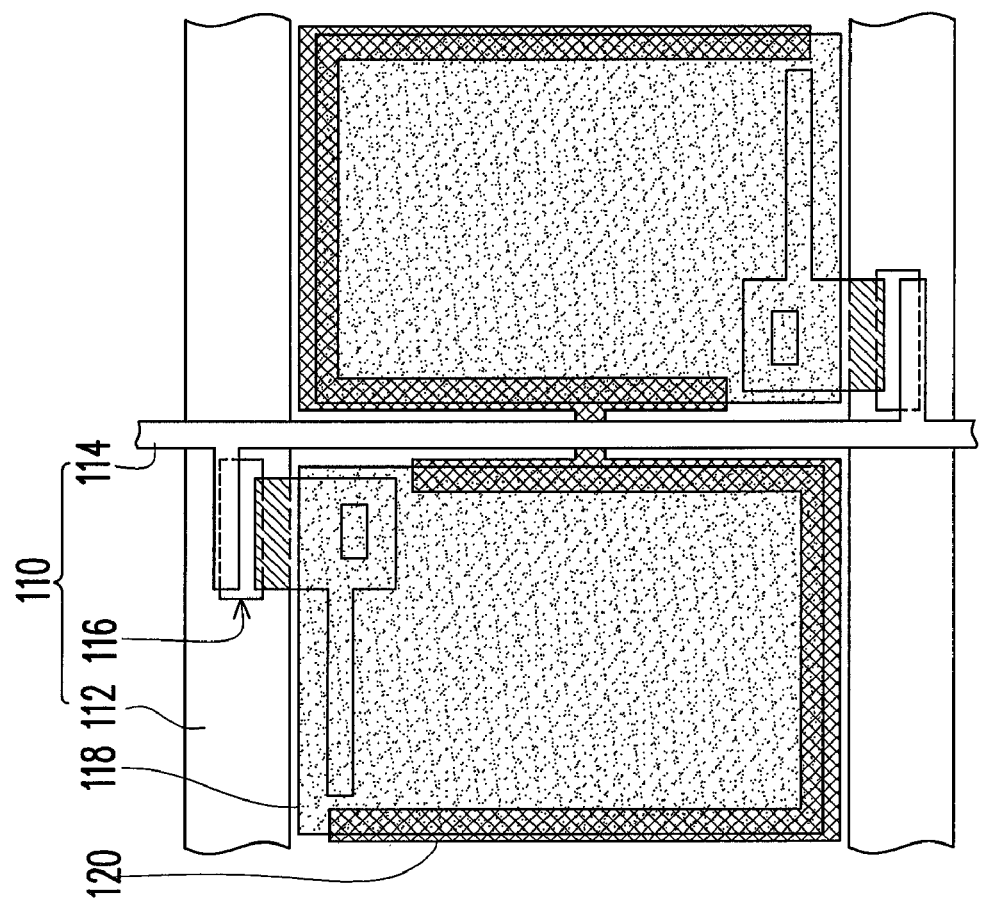
FIG. 1 is a schematic top view of a conventional active device array.
Figure 2:
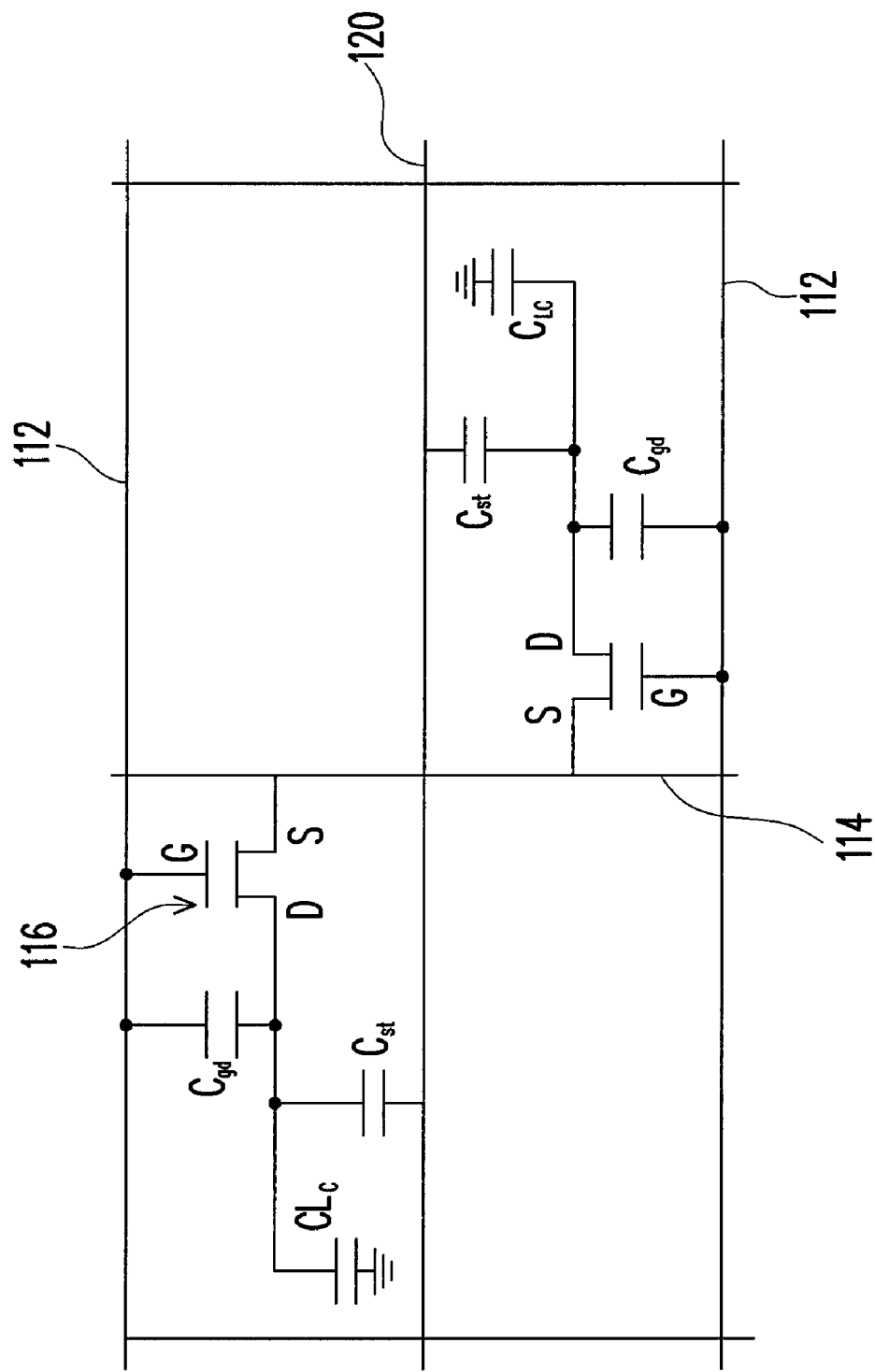
FIG. 2 is an equivalent circuit diagram of a liquid crystal display applying the active device array of FIG. 1.
Figure 3:
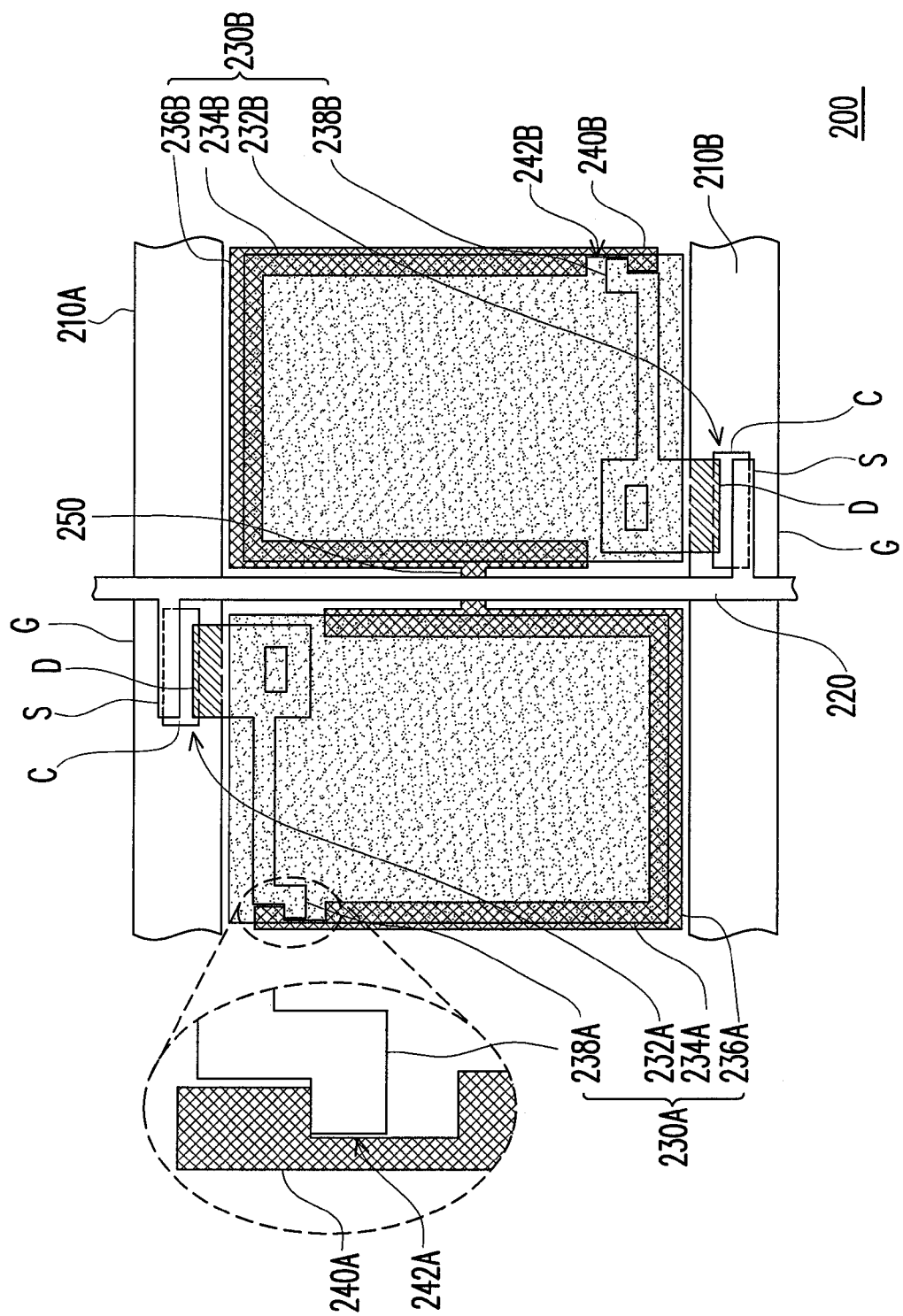
FIG. 3 is a schematic top view of a pixel set according to an embodiment of the present invention.

FIG. 3 is a schematic top view of a pixel set according to an embodiment of the present invention. Referring to FIG. 3, a pixel set 200 includes two scan lines 210A and 210B, a data line 220, and two pixels 230A and 230B. The two scan lines 210A and 210B are parallel to each other, and the data line 220 intersects with the two scan lines 210A and 210B. The two pixels 230A and 230B are located between the two scan lines 210A and 210B, and respectively at two opposite sides of the data line 220. The two pixels 230A and 230B are respectively electrically connected to the two scan lines 210A and 210B.

The pixel 230A includes an active device 232A, a pixel electrode 234A, a storage capacitance electrode 236A and a drain compensating pattern 238A. Similarly, the pixel 230B also includes an active device 232B, a pixel electrode 234B, a storage capacitance electrode 236B and a drain compensating pattern 238B. In the present embodiment, the disposition relationship between every element of the pixel 230A and the data line 220 and the disposition relationship between every element of the pixel 230B and the data line 220 correspond to each other. Therefore, only the pixel 230A is specifically described in the following.

The active device 232A of the pixel 230A is disposed adjacent to the data line 220, and the active device 232A includes a gate G, a drain D, and a source S. The gate G is electrically connected to a corresponding one of the scan lines 210A. In addition, the active device 232A further includes a semi-conductor pattern C located between the gate G, the source S and the drain D. In the present embodiment, the active device 232A is located on the scan line 210A. That is to say, the gate G of the pixel 230A is located inside the scan line 210A, and formed integrally with the scan line 210A. The source S is electrically connected to the data line 220. The source S and the drain D are located at the two sides of the gate G, respectively. The pixel electrode 234A is electrically connected to the drain D.

The storage capacitance electrode 236A is at least partially overlapped with the pixel electrode 234A and the storage capacitance electrode 236A includes a branch 240A. The branch 240A is located at a side of the pixel electrode 234A away from the data line 220, and has a concavity 242A. The concavity 242A is located at a side of the branch 240A adjacent to the data line 220, wherein a width of the branch 240A at a portion on which the concavity 242A is located is smaller than that of the branch 240A at the other portion.

The drain compensating pattern 238A is connected to the drain D, and at least a portion of the drain compensating pattern 238A is located inside the concavity 242A. A portion of the branch 240A at a side of the concavity 242A away from the gate G is not overlapped with the drain compensating pattern 238A. In the present embodiment, the drain compensating pattern 238A is, for example, formed integrally with the drain D. That is to say, the drain compensating pattern 238A is extended away the data line 220 from the drain D, and bended along with the edge of the branch 240A so as to be partially extended into the concavity 242A.

In the present embodiment, the storage capacitance electrodes 236A and 236B of the pixels 230A and 230B respectively are in a U-shape, and the storage capacitance electrodes 236A and 236B substantially respectively surround the edges of the pixel electrodes 234A and 234B. The branch 240A and the branch 240B are substantially respectively one branch of the U-shaped storage capacitance electrode 236A away from the data line 220 and one branch of the U-shaped storage capacitance electrode 236B away from the data line 220. In addition, the pixel set 200 further includes a connecting pattern 250 to electrically connect the two storage capacitance electrodes 236A and 236B. For example, the connecting pattern 250 and the two storage capacitance electrodes 236A and 236B are formed integrally. The U-shaped storage capacitance electrodes 236A and 236B are merely taken as examples in the present embodiment, and the present invention is not limited thereto.

According to formula (1) described in the description of related art, the gate-drain parasitic capacitance $C_{gd}$ between the gate G and the drain D may have influence on the display quality of the display applying the pixel set 200, while the area of the overlapping region between the gate G and the drain D is critical to the gate-drain parasitic capacitance $C_{gd}$. Therefore, the design of the pixel set 200 is preferable to make the area of the overlapping region between the gate G and the drain D in the pixel 230A to be consistent to that in the pixel 230B as shown in FIG. 3. At this moment, the branch 240A is aligned with the edge of the drain compensating pattern 238A at a side of the concavity 242A adjacent to the gate G. In the other pixel 230B, the branch 240B is also aligned with the edge of the drain compensating pattern 238B at a side of the concavity 242B adjacent to the gate G Certainly, the present invention is not limited to this embodiment. In other embodiments, the branch 240A can be partially overlapped with the drain compensating pattern 238A at a side of the concavity 242A adjacent to the gate G. Meanwhile, the branch 240B is also partially overlapped with the edge of the drain compensating pattern 238B at a side of the concavity 242B adjacent to the gate G. It is worthy to note that the area of the overlapping region between the branch 240A and the drain compensating pattern 238A is preferably equal to that between the branch 240B and the drain compensating pattern 238B.

The structure of the active device 232A and that of the active device 232B are substantially point asymmetric. If any displacement error is generated during the manufacturing process, the area of the overlapping region between the gate G and the drain D of the active device 232A is different from those of the active device 232B. At this time, the capacitance values of the gate-drain parasitic capacitances $C_{gd}$ in the pixels 230A and 230B are different such that the display effect of the pixels 230A and 230B are influenced. In another word, the displacement error causes the uneven display effect of the display applying the pixel set 200.

For compensating the negative influence of the displacement error, the pixel 230A and the pixel 230B of the present embodiment are disposed with the drain compensating patterns 238A and 238B. Moreover, the storage capacitance electrodes 236A and 236B of the pixel 230A and the pixel 230B in the present embodiment are configured with the concavity 242A and the concavity 242B, respectively. Once the position of the drains D are shifted due to the displacement error during the manufacturing process, the position of the drain compensating patterns 238A and the position of the drain compensating pattern 238B are changed correspondingly. At this moment, the areas of the overlapping regions between the gate G and the drain D in the pixel 230A and in the pixel 230B respectively are different. In addition, the area of the overlapping region between the drain compensating pattern 238A and the branch 240A is different from the area of the overlapping region between the drain compensating pattern 238B and the branch 240B. Accordingly, the variation of the gate-drain parasitic capacitance $C_{gd}$ caused by the displacement error can be compensated.

Figure 4:
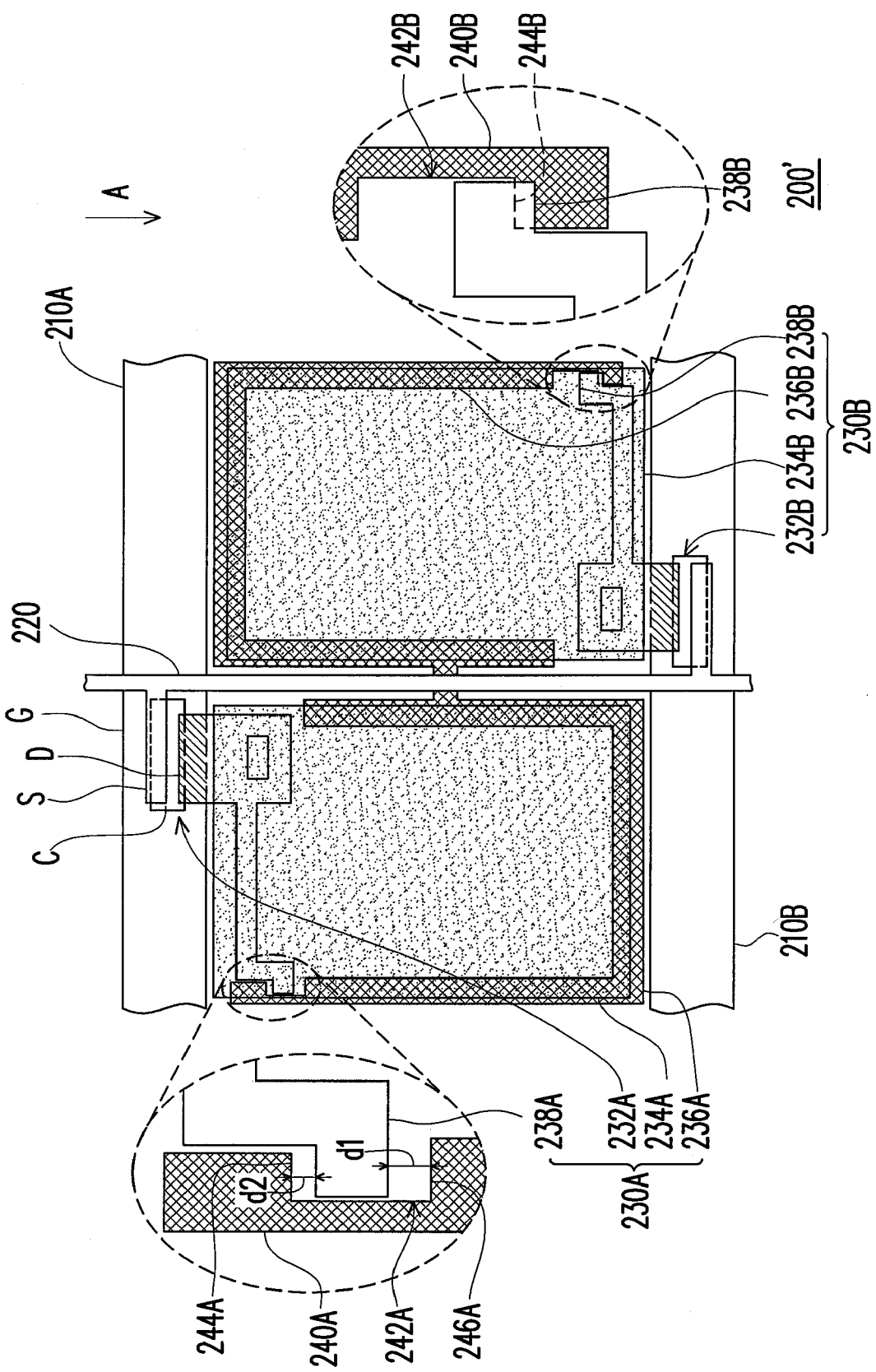
FIG. 4 is a schematic top view of a pixel set according to another embodiment of the present invention.

FIG. 4 is a schematic top view of a pixel set according to another embodiment of the present invention. Referring to FIG. 4, the pixel set 200' is substantially the same to the above pixel set 200, and the main differences therebetween are that the positions of the drain D, the source S, and the data line 220 in the pixel set 200' are shifted toward the direction of the arrow A corresponding to the scan lines 210A and 210B. That is to say, the elements of pixel 200' are the same as the elements of the pixel set 200, but the dispositions of the corresponding elements in the pixel set 200' are different from those in the pixel set 200.

Specifically, the scan line 210A, the scan line 210B, the storage capacitance electrode 236A, and the storage capacitance electrode 236B are formed by the same film layer when the pixel set 200' is manufactured, and thus they are patterned in the same process. Similarly, the drain D, the source S, the drain compensating pattern 238A, the drain compensating pattern 238B, and the data line 220 are formed by the same film layer, so that they are patterned in the same process. Therefore, if a displacement error along the direction of the arrow A is generated in one process, the patterns of the two film layers may be shifted to opposite directions, and then a structure such as the pixel set 200' is made. It is noted that the dispositions of the elements in the pixel set 200' are taken as examples, but the present invention is not limited thereto. If other displacement error is generated during the manufacturing process, the dispositions or the layout of the elements in the pixel 200' may be changed.

If no displacement error is generated during the manufacturing process, the area of the overlapping region between the gate G and the drain D in the pixel 230A and that in the pixel 230B are the same as that shown in FIG. 3. However, when the film layer of the drain D is shifted toward the direction of the arrow A corresponding to the scan line 210A, the area of the overlapping region of the gate G and the drain D in the pixel 230A is relatively reduced. Simultaneously, the area of the overlapping region between the gate G and the drain D in the pixel 230B is relatively enlarged. Therefore, the gate-drain parasitic capacitance $C_{gd}$ between the gate G and the drain D in the pixel 230A is different from the gate-drain parasitic capacitance $C_{gd}$ between the gate G and the drain D in the pixel 230B accordingly so that the negative influence of the uneven displaying is caused.

In the present embodiment, the drain compensating pattern 238A and the drain compensating pattern 238B are also shifted toward the direction of the arrow A corresponding to the storage capacitance electrode 236A and the storage capacitance electrode 236B due to the displacement error during the manufacturing process. Therefore, in the pixel 230B, the branch 240B is partially overlapped with the drain compensating pattern 238B at a side 244B of the concavity 242B adjacent to the gate G. Simultaneously, in the pixel 230A, the branch 240A is not overlapped with the drain compensating pattern 238A. Specifically, in the pixel 230A, a first distance d1 between the branch 240A and the drain compensating pattern 238A at a side 246A of the concavity 242A away from the gate G is, for example, larger than a second distance d2 between the branch 240A and the drain compensating pattern 238A at a side 244A of the concavity 242A adjacent to the gate G. Nevertheless, the present invention is not limited thereto, and the relationships between the first distance d1 and the second distance d2 are varied with the degree of the displacement error.

The displacements of the drain compensating pattern 238A and the drain compensating pattern 238B compensates the variations of the gate-drain parasitic capacitance $C_{gd}$ between the gate G and the drain D in the two pixels 230A and 230B. In detail, the gate-drain parasitic capacitance $C_{gd}$ in the pixel 230A is smaller than a desired value, and the gate-drain parasitic capacitance $C_{gd}$ in the pixel 230B is larger than the desired value. Hence, according to formula (1) disclosed in the description of the related art, the feed-through voltage $\Delta Vp$ of the pixel 230B may be higher than that of the pixel 230A without disposing the drain compensating pattern 238A, the drain compensating pattern 238B, the concavity 242A, and the concavity 242B in the pixel set 200'. In the present embodiment, the capacitance coupling effect caused by partially overlapping the branch 240B and the drain compensating pattern 238B is conducive to enhance the storage capacitance $C_{st}$, and thus the feed-through voltage $\Delta Vp$ of the pixel 230B is reduced. Accordingly, the variations between the feed through voltages $\Delta Vp$ of the pixel 230A and the pixel 230B are eliminated, and therefore, the display evenness of the pixel set 200' is improved.

Under the compensation of the drain compensating pattern 238A, the drain compensating pattern 238B, the concavity 242A, and the concavity 242B, the feed through voltages ΔVp of the pixel 230A and the pixel 230B are substantially the same. That is to say, the design of the present embodiment can efficiently compensate the negative influence on the display effect of the pixel set 200' caused by the displacement error. More specifically, in the pixel set 200' of the present embodiment, the drain compensating pattern 238A, the drain compensating pattern 238B, and the drains D are formed integrally, and are formed in the same manufacturing process. Therefore, any additional element is not needed. That is to say, the pixel set 200' of the present embodiment can compensate the negative influence due to the displacement error without increasing the cost.

In summary, the drain compensating pattern and the concavity of the branch in the storage capacitance electrode provide the compensation effect in the pixel set of the present invention so as to reduce the negative effect of the displacement error during the manufacturing process. Particularly, the displacement error during the manufacturing process makes the drains and the drain compensating patterns of the two pixels in the pixel set be shifted simultaneously, such that the capacitance values of the gate-drain parasitic capacitances and the storage capacitances of the two pixels are varied. Therefore, the feed through voltages of the two pixels are compensated and the pixel set of the present invention applied in a display has good display evenness. In addition, the drain compensating pattern in the present invention is extended from the drain and the branch is a part of the storage capacitance electrode, so the pixel set of the present invention is formed without adding any additional element. In other words, in addition to compensating the displacement error during the manufacturing process, the manufacturing method of the pixel set of the present invention is able to be compatible with the conventional manufacturing method of the pixel set without complicating the manufacturing process.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A pixel set, comprising:
   two scan lines parallel to each other;
   a data line intersected with the two scan lines;
   two pixels located between the two scan lines, respectively located at two opposite sides of the data line, and respective electrically connected to the two scan lines, wherein each of the pixels comprising:
      an active device disposed adjacent to the data line, and the active device comprising:
         a gate electrically connected to a corresponding one of the scan lines;
         a source electrically connected to the data line;
         a drain and the source located at two opposite sides of the gate;
      a pixel electrode electrically connected to the drain;
      a storage capacitance electrode at least partially overlapped with the pixel electrode, the storage capacitance electrode comprising a branch located at a side of the pixel electrode away from the data line, and the branch having a concavity located at a side of the branch adjacent to the data line; and
      a drain compensating pattern connected to the drain, at least a portion of the drain compensating pattern located inside the concavity, and the branch not overlapped with the drain compensating pattern at a side of the concavity away from the gate, wherein the branch is substantially aligned with an edge of the drain compensating pattern at a side of the concavity adjacent to the gate.

2. The pixel set of claim 1, wherein the storage capacitance electrode in each of the two pixels is in a U-shape, and the storage capacitance electrode substantially surrounds the edge of the pixel electrode.

3. The pixel set of claim 1, wherein the active device of each of the two pixels further comprises a semi-conductor pattern located between the gate, the source, and the drain.

4. The pixel set of claim 1, wherein each of the gates is located inside a corresponding one of the scan lines.

5. The pixel set of claim 1, further comprising a connecting pattern to electrically connect the two storage capacitance electrodes of the two pixels.

6. The pixel set of claim 5, wherein the connecting pattern and the two storage capacitance electrodes of the two pixels are formed integrally.

7. The pixel set of claim 1, wherein the drain compensating pattern and the drain in the same one of the two pixels are formed integrally.

8. The pixel set of claim 1, wherein a width of the branch in each of the two pixels at a portion on which the concavity is located is smaller than that of the branch at the other portion.

9. A pixel set, comprising:
   two scan lines parallel to each other;
   a data line intersected with the two scan lines;
   two pixels located between the two scan lines, respectively located at two opposite sides of the data line, and respective electrically connected to the two scan lines, wherein each of the pixels comprising:
      an active device disposed adjacent to the data line, and the active device comprising:
         a gate electrically connected to a corresponding one of the scan lines;
         a source electrically connected to the data line;
         a drain and the source located at two opposite sides of the gate;
      a pixel electrode electrically connected to the drain;
      a storage capacitance electrode at least partially overlapped with the pixel electrode, the storage capacitance electrode comprising a branch located at a side of the pixel electrode away from the data line, and the branch having a concavity located at a side of the branch adjacent to the data line; and
   a drain compensating pattern connected to the drain, at least a portion of the drain compensating pattern located inside the concavity, and the branch not overlapped with the drain compensating pattern at a side of the concavity away from the gate, wherein the branch is partially overlapped with the drain compensating pattern at a side of the concavity adjacent to the gate in one of the two pixels, and the branch is not overlapped with the drain compensating pattern in the other one of the two pixels.

10. A pixel set, comprising:
    two scan lines parallel to each other;
    a data line intersected with the two scan lines;
    two pixels located between the two scan lines, respectively located at two opposite sides of the data line, and respective electrically connected to the two scan lines, wherein each of the pixels comprising:

an active device disposed adjacent to the data line, and the active device comprising:
  a gate electrically connected to a corresponding one of the scan lines;
  a source electrically connected to the data line;
  a drain and the source located at two opposite sides of the gate;
a pixel electrode electrically connected to the drain;
a storage capacitance electrode at least partially overlapped with the pixel electrode, the storage capacitance electrode comprising a branch located at a side of the pixel electrode away from the data line, and the branch having a concavity located at a side of the branch adjacent to the data line; and
a drain compensating pattern connected to the drain, at least a portion of the drain compensating pattern located inside the concavity, and the branch not overlapped with the drain compensating pattern at a side of the concavity away from the gate, wherein a first distance between the branch and the drain compensating pattern of each of the two pixels at the side of the concavity away from the gate is larger than a second distance between the branch and the drain compensating pattern at a side of the concavity adjacent to the gate.

* * * * *